May 12, 1970 M. L. RAYNAL 3,511,731
COMPOSITE PANEL AND AN IMPROVED MANUFACTURING METHOD THEREFOR
Filed May 25, 1966

*Inventor:*
*Marcel Louis Raynal*
*Attorney*

United States Patent Office 3,511,731
Patented May 12, 1970

3,511,731
COMPOSITE PANEL AND AN IMPROVED MANUFACTURING METHOD THEREFOR
Marcel Louis Raynal, Perpignan, France, assignor to Societe des Panneaux Landais "Sopaland," Landes, France, a corporation of France
Filed May 25, 1966, Ser. No. 552,971
Int. Cl. B29c 23/00; B29j 5/00; B32b 5/16
U.S. Cl. 156—230
8 Claims

ABSTRACT OF THE DISCLOSURE

This improved method for manufacturing a composite panel comprises following steps: spreading over the surface of at least one metal sheet a mixture of powdered melamine and of a filler containing particles of alpha cellulose fibres or wood dust, heating said metal sheet and said mixture so that said mixture becomes gelled, placing a core or substrate such as a member of agglomerated plant particles between two metal sheets coated with said gelled mixture and placing the assembly in a heated press, applying pressure and heat, removing said assembly from the press without cooling the latter and removing the metal sheets from the coated panel.

---

Figure 1:
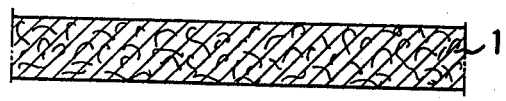

The present invention relates to composite panels and their method of manufacture and in particular to panels comprising a core containing plant particles or fibres.

Methods of manufacturing such panels (known as laminated or agglomerated panels) are known. These methods are carried out in one or two stages.

In the two-stage manufacturing method rough panels containing plant particles or fibres are manufactured in a first stage under a press at constant temperature. In a second stage, after having been cooled, said panels are squared up, pumiced, and both sides thereof receive an adhesive, one of said sides then receiving a decorative laminated layer of paper (of the type known under the trade name Formica) the other side receiving a subjacent paper known as a "balancing" paper, for precluding deformation of the panel under the stresses set up by the presence of the decorative laminated layer. The assembly is placed between the plates of a cold press for a given period of time depending on the type of adhesive employed so as to stick the layers and panel together under low pressure. Thus, in this method two presses are required and as a laminated layer comprising a plurality of sheets of paper is employed, the cost price is rather high.

In the one-stage manufacturing method, a core is constructed of plant particles or fibres agglomerated by spraying a resin of urea or melamine in an aqueous solution. Thereafter, one or a plurality of sheets of paper is disposed on either side of the core. The paper is decorative on one of the core sides and the paper on the other side is provided to preclude deformations. These papers are previously impregnated with resin of urea or melamine in an aqueous solution and suitably dried. This assembly is placed between two sheets of stainless steel which have a polished mat or rough surface and the whole is inserted between the plates of a press, and subjected to pressures varying from 12 to 80 kg./sq. cm. depending on the density of the products to be obtained. The temperature is increased gradually until a maximum of 150° C. is reached and this temperature is maintained constant during the polymerization time, which is about 10 min. Thereafter, the temperature of the press plates is lowered to about 60° C., so as to obtain laminated elements of good quality and in particular a decorative face having an excellent appearance.

Note that if the laminated panels are removed without previously cooling the press plates, namely with the latter at the temperature of 150° C., there are observed immediately or a short time after cracks, bursting or a very marked alteration in the gloss which render the panels useless. In this case, it has also been observed that sticking to the sheets could occur and the manufacturing method is no longer reliable.

The object of the present invention is to remedy the various drawbacks of the two methods described hereinbefore and consequently to manufacture in a single stage such panels or coverings, the panels being capable of being placed in and removed from the press at the temperature of 150° C. without any of the aforementioned defects occurring. Further, another object of the invention is to provide a decorative covering with or without a decorative paper.

The invention provides a new industrial product in the form of a composite panel composed of a core and at least one surface coating consisting of particles of alpha-cellulose or wood dust having a length of about 0.3–0.5 mm. and embedded in a polymerized substance consisting of urea or melamine resin.

The core can contain agglomerated plant particles or consist of an aluminum sheet which is oxidized on the surface.

The invention also provides an improved method of manufacturing or coating the aforementioned panels comprising putting the core in a press with at least one sheet, the inner face of the latter being in contact with said core and coated with a mixture of powered melamine and a coloured or colourless filler containing alpha-cellulose or wood dust fibres having a length of about 0.3–0.5 mm., insoluble in aqueous solutions.

According to another feature, the mixture placed on the sheet or sheets is previously gelled.

According to another feature, the core is placed in and withdrawn from the press at the same temperature of around 150° C.

Different coatings can be obtained, depending on the composition of the mixture deposited on the core, whether or not a sheet of decorative paper is interposed between the core and the sheet or sheets, and the surface condition of said sheets.

Further features and advantages of the invention will be apparent from the ensuing description with reference to the accompanying drawings to which the invention is in no way limited.

Figure 2:
Figure 3:
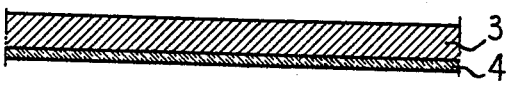
Figure 4:
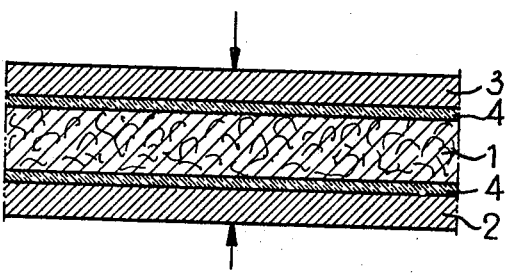
Figure 5:
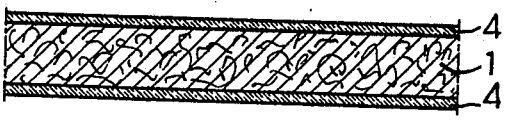
Figure 6:
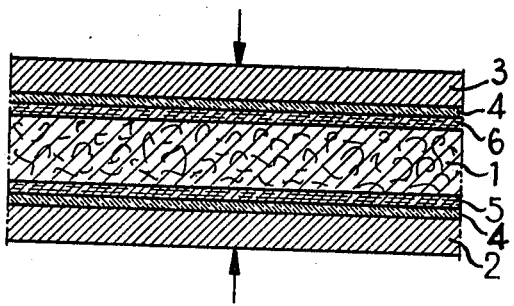

In the drawings:
FIG. 1 is a diagrammatic sectional view of a core of a panel containing plant particles or fibres;
FIG. 2 is a diagrammatic sectional view of a base sheet covered with a layer of a gelled mixture;
FIG. 3 is a sectional view of a surface sheet covered with the same mixture;
FIG. 4 is a sectional view of an assembly to be laminated in the case where no decorative paper is provided;
FIG. 5 is a sectional view of the finished panel without a decorative paper;
FIG. 6 is a diagrammatic sectional view of an assembly to be laminated in the case where a sheet of decorative paper and a sheet of a "balancing" paper are inserted, and
FIG. 7 is a sectional view of the finished panel obtained with the assembly shown in FIG. 6.

The core 1 consists of agglomerated plant particles or fibres. These particles can come from various plants such as wood, bagasses, grape stalks, vine shoots, linseed stalks etc. These particles receive a binder containing a resin of urea or melamine in an approximately 50% aqueous solution. The percentage of urea or melamine is about 6–12% of dry extract relative to the weight of the particles.

The base sheet 2 and the surface sheet 3 carry the same mixture 4 which is powdered and gelled. Various compositions of this mixture will be given hereinafter by way of examples.

Figure 7:
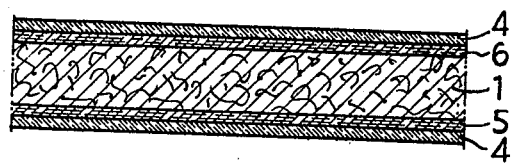

FIGS. 6 and 7 concern an embodiment in which a sheet of decorative paper 6 (which is or is not impregnated with a urea or melamine resin) is interposed between the surface sheet 3 and the core 1, a sheet of "balancing" paper 5 (which is or is not impregnated with a urea or melamine resin) is interposed between the core 1 and the base sheet 2. This balancing paper is provided to counteract stresses set up in the core by the presence of the decorative paper.

The general method of manufacturing, in accordance with the invention, laminated panels with decorative layers will now be described. Thereafter, there will be named a number of coatings obtained which vary in accordance with the use or the non-use of a decorative paper as in FIGS. 6 and 7, the composition of the mixture placed on the base and surface sheets, and the surface condition of said sheets.

The metal base sheet 2 and the metal surface sheet 3 of smooth or rough stainless steel, are first prepared by powdering them by any known means with a mixture 4 of about 75% of pure melamine resin and about 25% of a filler, the composition varying with the result to be obtained, this composition being insoluble in an aqueous solution. There may be some advantage in employing as filler commercially available moulding powders including, as the case may be, the use of appropriate colouring agents and hardening accelerators; however, in any case, the dimensions of the elementary particles of cellulose are in the region of about 0.5 mm. The compositions of a number of these fillers will be indicated hereinafter.

The mixture spread over the surface of the sheets is thereafter gelled by a short passage (of 1–3 minutes depending on the thickness of the substance to be gelled) in a tunnel oven at a temperature of about 130° C. Under the effect of the heat, the resin of the mixture becomes pasty and coats all the particles of the filler, and moisture which could exist in the filler is eliminated. Further, this passage through the oven at about 130° C. produces a pre-polymerization of the resin which permits upon the welding thereof to the core, a very rapid hardening right at the start of the polymerization threshold of the assembly. Consequently, a film becomes very rapidly impermeable and opposes the surface dispersion of the volatile products contained in the core. Moreover, this pre-polymerization diminishes sufficiently the fluidity of the melamine resin of the mixture contained in the film and this prevents the migration of the constitutents of this film which would otherwise produce more or less weak points in its structure and result in surface defects.

After the passage through the tunnel oven, a rapid cooling produces a hardening of the gelled film which very strongly adheres to the sheets so that the latter can be handled without difficulty.

Thereafter, the assembly to be laminated is placed between the two sheets thus prepared, this assembly comprising the core and if desired a sheet 6 (FIG. 6) of decorative paper and a sheet 5 of "balancing" paper; these sheets of paper may or may not be previously impregnated with urea or melamine resin.

The assembly is then directly put in a press at a temperature of 150° C. The assembly is subjected to a pressure between 10 and 80 kg./sq. cm., depending on the density of the product that it is desired to obtain, for a period of 10 minutes required for the polymerization. At the end of this time, the panel is withdrawn from the press at the temperature of 150° C. without the slightest surface defect being observed. The panel obtained (FIG. 5 or 7) comes away from the base sheet and surface sheet with no difficulty and these sheets are absolutely clean and ready for a new cycle of operations.

Therefore, the method according to the invention affords an enormous saving in time (10 minutes instead of 45 minutes per pressing cycle), due to the fact that the panels can be withdrawn from the press at the temperature of 150° C. This permits a production rate which is four times higher and affords also another advantage: the saving effected on the cooling device for the press, on the consumption of water employed for the cooling and on the heat which would otherwise be necessary for raising the temperature of the press after the cooling for a new operation.

Another important saving results from the fact that it is unnecessary to employ a decorative paper and that when one is used, a single sheet per panel side or face is all that is needed as opposed to previous requirements. Further, these sheets of paper have no need to be previously impregnated with urea or melamine resin, the fluidity of the melamine resin of the mixture fixed on the sheets being sufficient to impregnate the papers under the effect of the pressure and heat during the pressing operation. This is important since a paper impregnating apparatus is space consuming and costly.

The method according to the invention therefore results in a substantial reduction in the cost price of the panels.

There will now be mentioned a number of examples of panels obtained in accordance with: the composition of the mixture employed for the preparation of the base sheet and surface sheet, the use or the non-use of a decorative paper and "balancing" paper and the surface condition of the sheets employed. It must be understood that this series of examples is not intended to limit the scope of the invention.

EXAMPLE 1

The mixture placed on the base and surface sheets has the following composition:

| | Percent |
|---|---|
| Powdered melamine resin "285 R or 297" sold by the Company Prochal | 70–80 |
| Translucent moulding powder "Ervamine CN" sold by the Company Plastugil | 30–20 |

The assembly to be laminated consists solely of a core composed of agglomerated plant fibres; the base and surface sheets are smooth.

In this way, a transparent coating showing the appearance of the surface of the core is obtained. This is of particular interest if the core is an agglomeration of vine shoots which has a particularly attractive appearance.

EXAMPLE 2

The composition of the mixture is as follows:

| | Percent |
|---|---|
| Powdered melamine resin "285 R or 297" sold by the Company Prochal | 40–60 |
| Moulding powder "Ervamine series B" or "Uralite series B" (containing opaque wood dust) of various colours | 60–40 |

An opaque coloured coating without decorative paper is obtained. Depending on whether the sheets are smooth or not, a smooth panel having opaque surface effects is obtained.

EXAMPLE 3

The composition of the mixture is as follows:

| | Percent |
|---|---|
| Powdered melamine resin "285 R or 297" sold by the Company Prochal | 30–40 |
| Translucent moulding powder "Ervamine CN" | 15–25 |
| Bronze powder | 55–35 |

EXAMPLE 3—Continued

| | Percent |
|---|---|
| or | |
| Powdered melamine resin "285 R or 297" | 35-40 |
| Moulding powder "Ervamine series B" or "Uralite series B" (various colours) | 50-55 |
| Bronze powder | 10-5 |

There is then obtained a metallized opaque coating without a surface paper. It is also possible to obtain a smooth coating or a coating having surface effects, depending on whether smooth or unsmooth sheets are employed.

EXAMPLE 4

The mixture has the following composition:

| | Percent |
|---|---|
| Powdered melamine resin "285 R or 297" | 70-80 |
| Translucent moulding powder "Ervamine CN" | 30-20 |

The assembly to be laminated comprises the core, a sheet of decorative paper on one side and a sheet of "balancing" paper on the other, these two sheets being previously impregnated with urea or melamine resin in a 50/50 aqueous solution and suitably dried.

An opaque coating with decorative paper is obtained.

EXAMPLE 5

The mixture has the same composition as in Example 4 but the decorative and balancing papers are not previously impregnated. It is in this case necessary that they be porous so that the weld between the gelled layers and the core can be achieved. For this purpose, non-sized papers must be employed.

Coatings similar to those obtained in Example 4 are then obtained.

It is particularly easy to recognize a coating obtained by the method according to the invention by employing conventional microscopic methods of examining the surface of the panel.

The cellulosic fibres constituting the base of the conventional coatings have a length of about 2-4 mm., those constituting the coating according to the invention have a length of about 0.5 mm.

The process of checking which can be employed can be for example the following:

The coating is attacked by 30% hydrochloric acid for about 30 minutes and the coating is then washed with water and put in contact with an aqueous solution of fuchsine which is wiped after a few minutes. The coating is then observed with the microscope (magnification 250) and the length of the surface fibres can be measured to within 1/100 mm.

The coating is attacked by a 5% solution of silver nitrate; the surface is observed with the microscope (magnification 250) and the length of the surface fibres can also be measured.

The coating is attacked with 20 volumes of oxygenated water, the surface is observed with the microscope in polarised light and it is possible, as before, to measure the length of the surface fibres.

It must be understood that the invention is not intended to be limited by the described and illustrated embodiments which are merely intended to serve as examples. Thus, in particular, the method of coating according to the invention can also be applied to the coating of sheets of aluminum whose surface has been previously oxidized by passage in an acid or alkaline bath. This layer of oxide ensures that the coating is maintained on the sheet of aluminum. If desired, this coating method can also be applied to panels which have already been manufactured, with a decrease in the thickness of the panel of the order of about 10-15%.

Having now described my invention what I claim as new and desire to secure by Letter Patent is:

1. Method for producing a composite panel comprising: taking a core of agglomerated plant particles or fibres spreading over the surface of two metal sheets, a mixture of 30-80% of non-polymerized powdered melamine resin and of a filler containing particles of a material selected from a group consisting of alpha cellulose fibres and wood dust, said particles having a length of about 0.3-0.5 mm., said filler being insoluble in aqueous solution, heating said metal sheets and said mixture at about 130° C. during about 1-3 minutes so that said mixture becomes gelled, cooling said metal sheets so as to harden the gelled mixture, placing said core between said metal sheets with said gelled mixture in direct contact with said core, placing said core and said metal sheets in a heated press, applying pressure and heat to consolidate the panel, removing the consolidate panel from the heated press, the core and the metal sheets being placed and heated in the press and removed from said press at the same temperature, and thereafter removing said metal sheets from said panel.

2. Method as claimed in claim 1, wherein the assemblage comprising said core and sheet is placed in said press and removed from said press at the same temperature which is about 150° C.

3. Method as claimed in claim 1, wherein a decorative sheet of paper is placed on one face of said core and a balancing sheet of paper is placed on the other face of said core before placing said core between the two metal sheets.

4. Method as claimed in claim 1, wherein said filler is a moulding powder and comprises powdered resin and particles of alpha-cellulose whereby the coating of the finished panel is transparent.

5. Method as claimed in claim 1, wherein said filler comprises powdered resin and wood dust whereby the coating of the finished panel is opaque.

6. Method as claimed in claim 1, wherein said mixture includes a metallic powder.

7. Method as claimed in claim 1, wherein said metal sheet is smooth.

8. Method as claimed in claim 1, wherein said metal sheet is of steel and has a rough surface.

References Cited

UNITED STATES PATENTS

| | | | |
|---|---|---|---|
| 2,311,518 | 2/1943 | Caligari | 117—64 |
| 2,347,697 | 5/1944 | Levey | 161—162 |
| 2,601,284 | 6/1952 | Hemming et al. | 161—262 |
| 2,699,417 | 1/1955 | Repsher et al. | 161—261 |
| 2,801,198 | 7/1957 | Morris et al. | 161—263 |
| 3,067,077 | 12/1962 | Latella et al. | 161—263 |
| 3,294,619 | 12/1966 | Noland | 161—165 |

WILLIAM J. VAN BALEN, Primary Examiner

U.S. Cl. X.R.

156—62.2, 246, 247, 320, 322; 161—162, 170, 215, 263, 413